(12) United States Patent
Haselden, Jr.

(10) Patent No.: US 6,293,430 B1
(45) Date of Patent: *Sep. 25, 2001

(54) APPARATUS AND METHOD FOR RECOVERING BEVERAGE SYRUP

(76) Inventor: Odell Kent Haselden, Jr., 1206 Mathis Ferry Rd., Mt. Pleasant, SC (US) 29464

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/405,569

(22) Filed: Sep. 25, 1999

(51) Int. Cl.⁷ .................................................. B67D 5/00
(52) U.S. Cl. .................. 222/67; 222/64; 222/148
(58) Field of Search ................ 222/64, 67, 148; 141/89, 91, 1

(56) References Cited

U.S. PATENT DOCUMENTS

| | | |
|---|---|---|
| 3,626,970 | 12/1971 | Jones . |
| 3,993,219 | * 11/1976 | Franzosi ................................. 222/67 |
| 4,669,496 | 6/1987 | Kemp et al. . |
| 4,683,921 | * 8/1987 | Neeser .................................. 141/91 |
| 4,941,593 | 7/1990 | Hicks et al. . |
| 5,069,244 | 12/1991 | Miyazaki et al. . |
| 5,174,323 | 12/1992 | Haselden . |
| 5,215,128 | * 6/1993 | Neeser .................................. 141/91 |
| 5,316,180 | * 5/1994 | Cleland ................................. 222/67 |
| 5,641,006 | * 6/1997 | Autrey et al. ......................... 222/64 |
| 5,730,324 | * 3/1998 | Shannon et al. ....................... 222/64 |

OTHER PUBLICATIONS

Micro–Blend, Inc. correspondence and other documents relating to Micro–Blend's blending processes, dated Jan. 28, 1997, May 15, 1997. Oct. 1, 1997 Oct. 2, 1997, Nov. 12, 1997, Jan. 20, 1998, Jul. 21, 1998, Aug. 25, 1998, and Aug. 16, 1999.

* cited by examiner

Primary Examiner—J. Casimer Jacyna
(74) Attorney, Agent, or Firm—Harleston Law Firm; Kathleen M. Harleston

(57) ABSTRACT

An apparatus and method for automatically gauging container and syrup requirements for beverage production includes: (a) an enclosed syrup recovery tank, (b) an inlet port leading into the syrup recovery tank; (c) an outlet port, syrup being transportable into and out of the syrup recovery tank through inlet and outlet distribution lines; (d) a pump connected to the outlet distribution lines for pumping syrup from the syrup recovery tank; (e) a microprocessor; (f) a level transmitter for measuring syrup levels within the syrup recovery tank and transmitting information concerning syrup levels to the microprocessor; (g) a level control valve on the inlet distribution line for controlling the flow of syrup to the syrup recovery tank; and (h) a control mechanism connected to the microprocessor for a user to input to, and receive information from, the microprocessor. This apparatus and method allow conservation of syrup and containers at the end of a production run.

12 Claims, 2 Drawing Sheets

APPARATUS AND METHOD FOR RECOVERING BEVERAGE SYRUP

BACKGROUND OF THE INVENTION

1. Technical Field

This is an apparatus and method for monitoring syrup and container inventories during a beverage production run, and ending the production run with substantially no wasted syrup or containers, more particularly a syrup recovery system for insertion into a beverage production system.

2. Background Information

To produce soft drinks and other beverages, many beverage companies have beverage production systems that spread across thousands of square feet of plant space. Simply put, in many existing systems for producing carbonated soft drinks, concentrated, pre-mixed beverage syrups are first channeled from syrup supply tanks through pipes to blend tanks where they are mixed with appropriate levels of drinking water. Carbon dioxide is bubbled through the diluted syrups and the soft drink then flows through lines to a filler system. At the filler, bottles or cans on an automated line are filled with exact amounts of the soft drink.

There are certain requirements during this soft drink production process. To maintain product quality, measurements throughout this production process must be exact. Secondly, product tanks and lines which hold product must be absolutely sanitary so the drinks do not become contaminated with dirt, bacteria or the like. Third, unused syrup or soft drink, some of which is diluted syrup washed out by periodic cleanings of the system, must be carefully disposed of to protect the environment. Though it sounds innocuous to a layman, high doses of sugar from waste soft drink can upset the ecological balance in, for example, a stream to which undertreated industrial waste effluent empties. Syrup increases biochemical oxygen demand (BOD) in a discharge stream, which upsets the balance of animals and plants indigenous to the stream. Since many bottlers must pay by the gallon to treat their industrial waste, it is to their benefit to keep wasted soft drink syrup to a minimum.

If beverage production can be made more exact and controlled, a small amount of syrup can be conserved with each production run. The syrup recovery system of the present invention does allow the conservation of a certain amount of concentrated syrup during the production process. The recovered syrup is sanitary because it is captured at the outset within the production system. This recovered syrup can be made into soft drinks, which decreases product costs. It also reduces a beverage company's wastewater treatment costs, and in turn helps in a small way to protect the environment. Although the amount of syrup recovered by the present syrup recovery system and method is ordinarily only a few gallons per bottling run, total savings over a one year period can be significant. The syrup recovery system of the present invention also enhances quality control by allowing a plant operator to more precisely control syrup measurements during the production process.

With this syrup recovery system, a plant operator can more precisely forecast the number of containers that will be needed for ending a production run. Also, a plant operator desiring to fill a known number of containers can automatically drain from a syrup supply tank only the exact amount of syrup needed for that particular run. This decreases or eliminates wasted containers and reduces labor costs. This syrup recovery system can be inserted into an existing beverage production system, or it can be incorporated into a new beverage production system being designed or constructed.

BRIEF SUMMARY OF THE INVENTION

The present invention is an apparatus and method for automatically gauging container and syrup requirements for beverage production. This syrup recovery apparatus comprises:

(a) an enclosed syrup recovery tank connected by one or more inlet distribution lines to one or more syrup supply tanks, and connected to one or more outlet distribution lines leading out of the syrup recovery tank;

(b) an inlet port leading into the syrup recovery tank, the inlet port being located on a lower portion of the syrup recovery tank and being connected to the syrup supply tanks by the inlet distribution lines, syrup being transportable through the inlet distribution lines into the syrup recovery tank from the syrup supply tanks;

(c) an outlet port on a lower portion of the syrup recovery tank, the syrup being transportable from the syrup recovery tank through the outlet port and through the outlet distribution lines;

(d) a pump is connected to the outlet distribution lines adjacent to the syrup recovery tank, the pump being adapted for pumping syrup from the syrup recovery tank through the outlet distribution lines;

(e) a microprocessor in communication with the syrup recovery tank;

(f) a level transmitter within the syrup recovery tank adapted for measuring syrup levels within the syrup recovery tank and transmitting information concerning syrup levels to the microprocessor;

(g) a level control valve on the inlet distribution line for controlling the flow of syrup to the syrup recovery tank, the level control valve being adapted to receive input from the microprocessor;

(h) a control mechanism connected to the microprocessor adapted to enable a user to input to the microprocessor, and to receive information from the microprocessor, and (i) a source of electrical power within, on, or connected to the control mechanism; wherein the apparatus allows conservation of syrup and containers.

BRIEF DESCRIPTION OF THE SEVERAL VIEWS OF THE DRAWINGS

A more complete understanding of the invention and its advantages will be apparent from the following detailed description taken in conjunction with the accompanying drawings, wherein examples of the invention are shown, and wherein.

DETAILED DESCRIPTION OF THE INVENTION

Figure 1:
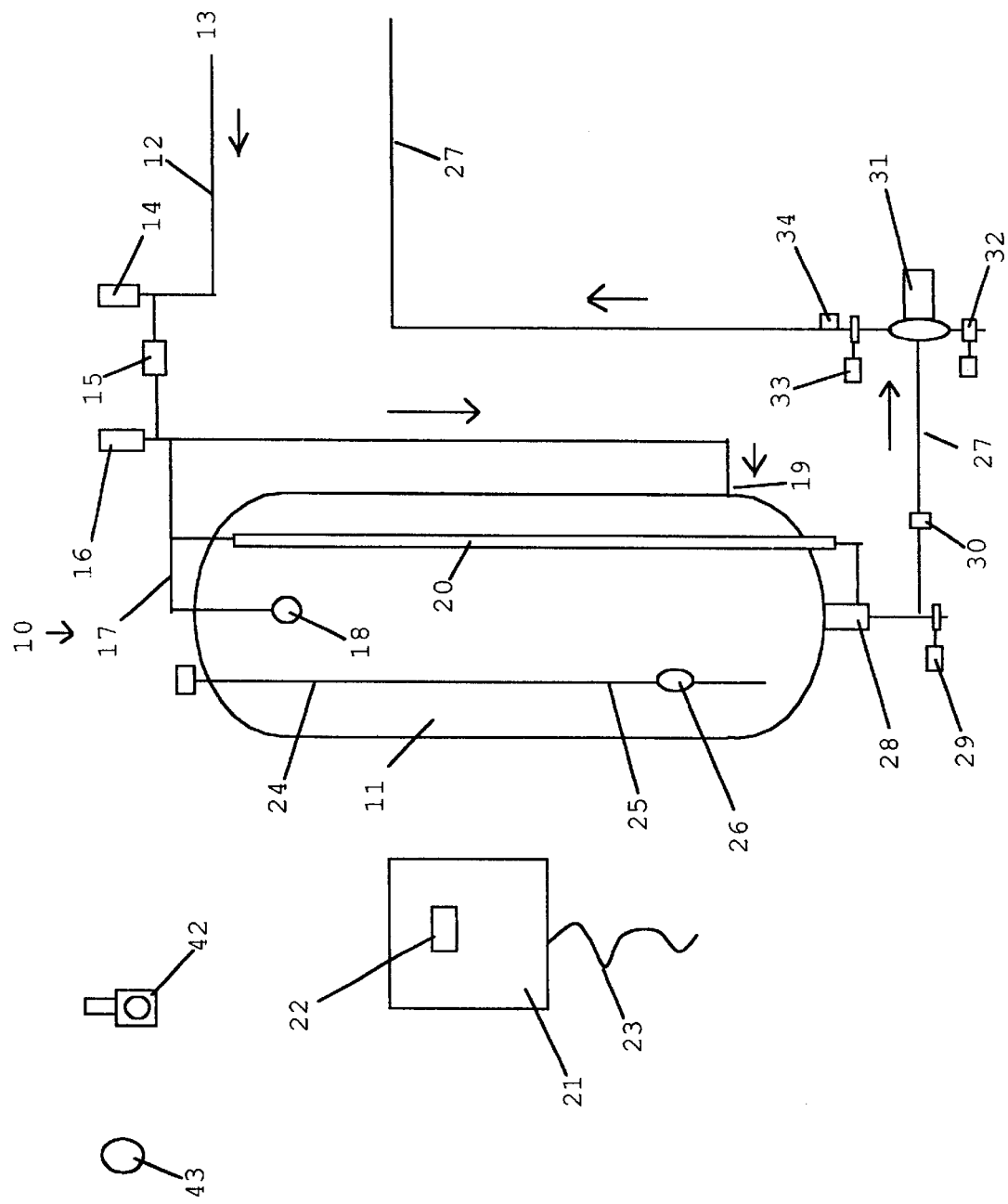
FIG. 1 shows a schematic diagram of a syrup recovery system according to the present invention.

In the following description, like reference characters designate like or corresponding parts throughout the several views. Also, in the following description, it is to be understood that such terms as "upper," "lower," "within," and the like are words of convenience and are not to be construed as limiting terms. Referring in more detail to the drawings, the invention will now be described.

Referring to FIG. 1, a syrup recovery system 10 is shown in a preferred embodiment. An important element of the present syrup recovery system 10 is a closed syrup recovery tank 11, which is connected by means of inlet distribution lines 12 to one or more syrup supply tanks 13 for storing beverage syrup. Concentrated, pre-mixed syrup (liquor) is stored in the syrup supply tanks. Normally, the syrup supply tank 13 stores several thousand gallons of syrup, while the syrup recovery tank 11 preferably accommodates about 100 to 200, most preferably about 140 to 150, gallons of syrup. The recovery tank 11 is thus an intermediate sized tank.

The syrup supply tank 13 is ordinarily located in the plant facility some distance away from the syrup recovery tank 11 and the rest of the beverage production system. A large beverage production plant may have a number of remote syrup supply tanks, each holding a syrup for a different soft drink. Those supply tanks 13 are connected to the production system by varying lengths of lines (usually pipes), and are often several hundred feet long. Those varying lengths make it even more difficult in a beverage production system without a syrup recovery system to gauge the remaining amount of syrup needed for a production run.

As shown in FIG. 1, beverage syrup is transported from the syrup supply tank 13 through the inlet distribution lines 12 into the syrup recovery tank 11. Syrup flow to the recovery tank 11 is automatically controlled by a level control valve 14. The level control valve 14 is located along the distribution lines 12 between the syrup recovery tank 11 and the supply tank 13, preferably close to the recovery tank 11 as shown in FIG. 1. Preferably, when the level control valve 14 is open, syrup flows into the syrup recovery tank 11 to maintain the pre-programmed level of syrup in the tank 11. When the valve 14 is closed, the level of syrup in the tank 11 drops to the pre-programmed point. The level control valve is adapted to be automatically opened and closed by the microprocessor 22. The valve 14 is automatically opened and closed by the system 10. This valve opening and closing serves to control the inventory of syrup in the recovery tank 11. A sightglass 15 is preferably located along distribution line 12 to allow an operator to view the syrup as it passes through the line.

For cleaning, an optional but preferred divert valve 16 is positioned along the inlet distribution line 12 after the sightglass 15. After a production run, lines and tanks are cleaned. For cleaning, water instead of syrup is channeled through the lines. For cleaning, the divert valve 16 is opened so that the water can flow through a "cleaning line" 17 down from the top of the syrup recovery tank 11 into the tank. The water preferably sprays down into the syrup recovery tank from a spray nozzle or ball 18 at the end of the cleaning line 17. The effluent is flushed out through a drain at the bottom of the syrup recovery tank 11, where it is caught and channeled to a wastewater treatment facility. The syrup recovery system 10 is ordinarily flushed out several times. Cleaning chemicals/detergents can be mixed in with the water for cleaning.

When the system is not being cleaned, the syrup flows along distribution line 12 (in the direction of the arrows) next to the syrup recovery tank 11 to an inlet port 19. Referring to FIG. 1, the inlet port 19 is located on a lower portion, preferably along the bottom quarter, of the syrup recovery tank 11. The inlet port 19 leads into the syrup recovery tank 11. The syrup flows into the syrup recovery tank through the inlet port.

A level indicator 20 preferably extends down along the outside of the syrup recovery tank 11. It is preferably connected at one (top) end to the cleaning line 17 and at an opposite, bottom end to an outlet at the bottom of the syrup recovery tank. The level indicator 20 is a simple, back-up device for the operator to visually check the level of syrup in the tank from outside the tank.

On the outside of the tank is a control mechanism 21, ordinarily within a control panel. With the present system, the controls are centrally located in a convenient location. The control panel may alternatively be remoted to anywhere in the plant to allow easy access by the plant operator. The element that allows this accessibility is a microprocessor 22, which is in communication with the syrup recovery tank. The control mechanism 21 is connected with the microprocessor 22 for enabling a user to input information to the microprocessor, and to receive information (preferably by visual messages) from the microprocessor. Normally, a user inputs to the microprocessor using knobs, dials, buttons or a touch screen on the front of the control panel. Preferably, this system 10 includes a mechanical switch, or electrical component within the control mechanism for enabling the microprocessor. The control mechanism 21 preferably includes a screen for visually displaying information received from the microprocessor. The control mechanism, microprocessor, etc. are powered by electricity. This system 10 includes a source of electrical power 23 within, on, or connected to the control mechanism, preferably a cord with a plug for insertion into an electricity outlet. The control mechanism may also include extended memory devices, such as EEPROM, in communication with the microprocessor. The microprocessor controls, for example, the opening and closing of the divert valve. A personal computer, or other remote mechanism for allowing a user to program the microprocessor, or visually indicating to a user what is being programmed, may also be included herein.

Importantly, the microprocessor 22 is connected with, and receives information from, a level transmitter 24 within the syrup recovery tank 11, preferably by wiring. The level transmitter 24 is adapted for measuring syrup levels within the syrup recovery tank, and transmitting such information to the microprocessor. The level transmitter 24 preferably comprises a probe 25, which extends down into the recovery tank 11, and a movable float 26 at the bottom portion of the probe. In use, the float 26 floats on top of the syrup in the recovery tank, and the probe 25 sends back information concerning changing syrup levels electronically to the microprocessor 22. Preferably, a transmitter within the level transmitter mechanism measures voltage across the probe according to the height of the float along the probe, which varies with the level of syrup in the recovery tank. The transmitter converts voltage readings to the number of gallons of syrup in the recovery tank. Necessary information has been pre-programmed into the microprocessor, such as the amount of syrup needed for each container (e.g., bottles, cans), which varies with the different types of syrups (e.g., cola soft drink syrup requirements are different than lemon-lime soft drink syrup requirements). The syrup recovery system 10 can thus respond automatically by, for example, closing the level control valve 14.

The syrup recovery tank is also connected to outlet distribution lines 27, which conduct the syrup away from the syrup recovery tank. Inlet distribution lines 12 run into the syrup recovery tank 11 and are called "inlet" here simply to distinguish them from lines running from the recovery tank 11, called here "outlet" distribution lines 27. Both distribution lines are most commonly systems of pipes. Syrup exits the syrup recovery system through an outlet port 28. The outlet port is located on a lower portion of the syrup recovery tank, preferably directly at the bottom center of the tank. The syrup is transportable from the syrup recovery tank through the outlet port 28 and through the outlet distribution lines 27. A tank drain valve 29 is preferably located along the outlet distribution line just after the outlet port 28 for draining the tank 11 during cleaning.

A conductivity sensor 30 on the outlet distribution line 27 preferably follows the tank drain valve 29. The conductivity sensor is adapted to input to the microprocessor when the syrup recovery tank 11 has emptied. The conductivity sensor 30 is preferably wired to and feeds data back to the microprocessor 22 to notify the microprocessor the point in time when the syrup recovery tank is empty.

As shown in FIG. 1, a pump 31, such as a centrifugal pump, a positive displacement pump, or a diaphragm pump, is connected to the outlet distribution lines adjacent to the syrup recovery tank for pumping the syrup from the syrup recovery tank 11 through the outlet distribution lines 27. Preferably, a centrifugal pump pulls the thick syrup through the outlet distribution line from the syrup recovery tank 11. The pump 31 preferably includes a pump drain valve 32. After the pump 31, a shut-off valve 33 is preferably located along the outlet distribution line 27. This valve 33 is for closing off the line 27. A carbon dioxide blow valve 34 is preferably located along the outlet distribution line after the shut-off valve 33. This valve 34 is for emitting carbon dioxide from the line 27. Carbon dioxide is preferably used to push the last syrup in a production run along the line and thus clear the line. The syrup recovery tank 11 is not pressurized, and head pressure from carbon dioxide is not needed to push the viscous syrup out through the distribution lines. This syrup recovery system 10 can be incorporated into a soft drink production system initially, or it can be inserted into an existing soft drink production system for long term cost savings and improved efficiency.

This syrup recovery system 10 is preferably for use in beverage production systems with nonpressurized mix tanks, but it can be adapted for use in systems with pressurized tanks. Although it is preferred for incorporation into carbonated or noncarbonated soft drink production systems, this syrup recovery system could be used in beer-making systems or in any liquid material production system. The system is energy efficient.

In use, the syrup recovery system of the present invention is particularly helpful in two different situations: syrup cut-off, and container cut off. In the former case, a pre-programmed amount of beverage syrup, is loaded into the recovery system 10 and the canning/bottling process is initiated. When the last container is loaded onto a container conveyor, the level control valve 14 is closed. The amount of syrup and the number of containers on the conveyor are measured in this fashion. With the present recovery system, the number of containers and the syrup in the system will run out at the same time. In the latter case, the syrup is purged from the inlet distribution line 12 into the system 10. The syrup level then falls to the pre-programmed syrup level and shuts a container stop gate. The conveyor is then loaded to a container loading point. The amount of syrup and the containers have been measured using the present system 10. Containers and ingredient have not been wasted.

Figure 2:
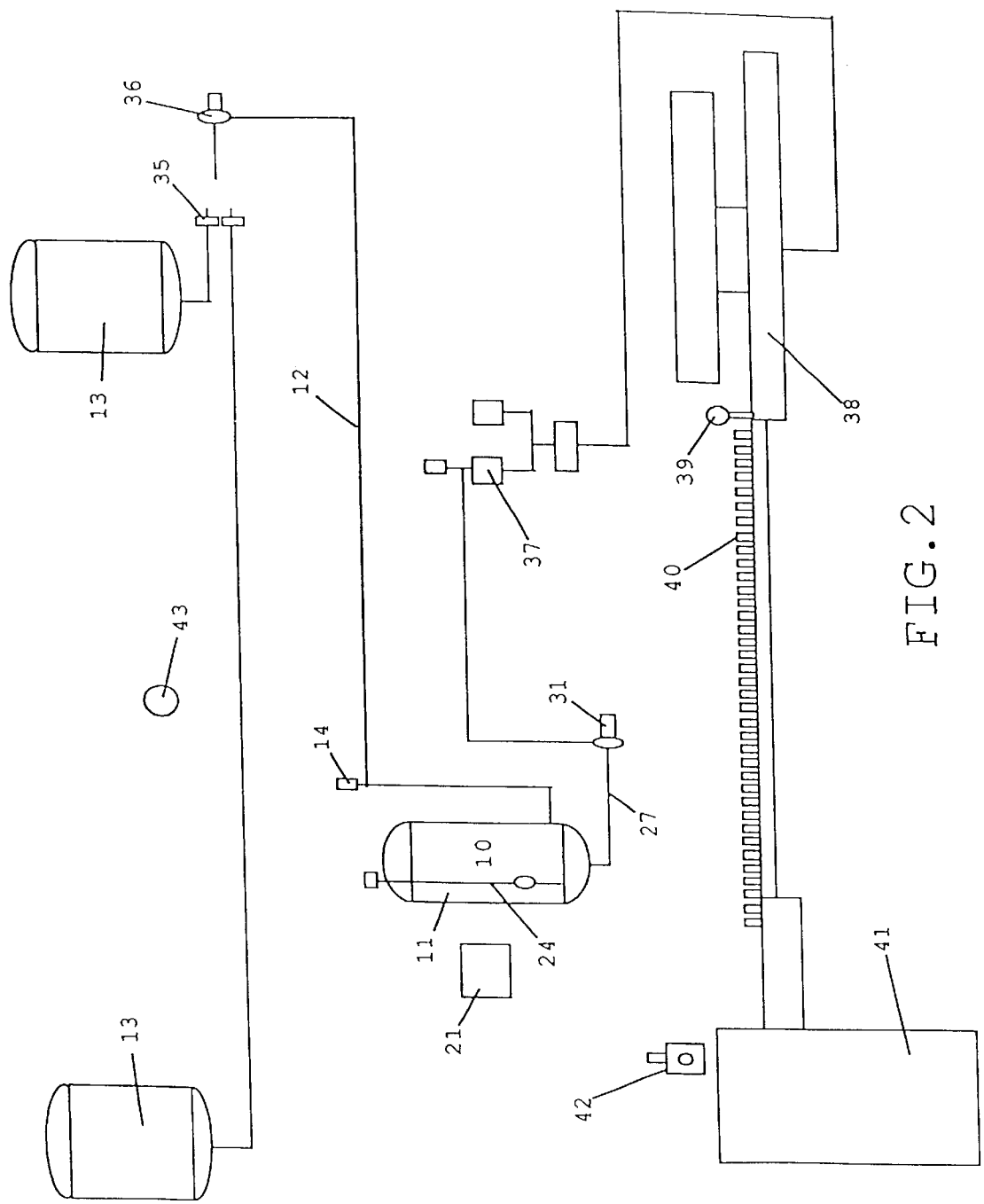
FIG. 2 shows a schematic diagram of a syrup recovery system according to the present invention within a beverage production system.

Referring to FIG. 2, the present syrup recovery system (apparatus) 10 is shown in place in a beverage production system. Syrup supply tanks 13 supply syrup, which is transported through distribution lines to the present system 10. A syrup supply valve 35 opens to allow the syrup to flow through the line 12, or closes to halt the flow of syrup through the line 12. A syrup supply pump 36 pumps the viscous syrup through the distribution lines 12. The syrup then enters the syrup recovery system through the inlet distribution line(s) as described above. From the syrup recovery system, the syrup is preferably transported through a blender 37 and optionally a carbon dioxide cooler, where it is blended with water and carbon dioxide is bubbled through it to make the soft drink. Although the recovery system is preferred for use in carbonated soft drink production systems, it can as easily be used for producing any noncarbonated drinks in which a syrup must be blended with other ingredient(s), such as orange juice.

The drink is then preferably transported through distribution lines to a filler 38, where containers are filled with pre-determined amounts of the drink. A filler stop gate 39 or similar automated mechanism is preferably used to halt the procession of containers 40 on a conveyor belt or the like into the filler 38. The microprocessor 22 is adapted to automatically open or close the stop gate on a filler. A depalletizer 41 or the like in the beverage production system automatically removes bottles from pallets. From the depalletizer, the containers 40 are fed to the conveyor belt.

The microprocessor 22 receives feedback from, and/or outputs to, many sources within the system 10. These are either wired to the microprocessor, connected to the microprocessor by air lines activated by electric solenoids within the control mechanism, or connected by other means. The microprocessor is connected to: the level control valve 14, the divert valve 16, the level transmitter 24, the tank drain valve 29, the conductivity sensor 30, and the pump drain valve 32. The microprocessor also inputs to a depalletizer alarm and input button 42, which is adjacent to the depalletizer 41, and a syrup cut-off alarm 43, which is adjacent to the syrup supply tanks 13. These are all essential or optional parts of the syrup recovery apparatus of the present invention.

There are two production situations in which the present syrup recovery system proves particularly useful. In the first, there is a limited, known amount of syrup and an unlimited number of containers available to be used for that production run. In that case, the syrup in the syrup supply tank 13 is depleted, then all of the syrup in the distribution lines 12 is pushed into the syrup recovery system 11. The syrup recovery tank level drops down to a pre-programmed set-point. The filler stop gate 39 closes automatically and the depalletizer alarm 42 will light. The containers 40 between the filler stop gate 39 and the depalletizer 41 are then measured. The depalletizer operator then loads the conveyor belt with containers and then pushes the depalletizer input button 42, which opens the filler stop gate. There will then be a measured amount of syrup and a measured number of containers to complete the run-out (end of production) process.

In the second situation, there is an unlimited amount of syrup and a limited number of containers available to be used for that production run. The operator pushes a button on the control panel, which inputs to the microprocessor 22. The amount of syrup in the syrup recovery tank 11 then falls to the pre-programmed cut-off point, which turns on the depalletizer alarm 42 light. The depalletizer operator then loads all the containers available onto the conveyor belt and then presses the depalletizer alarm and input button 42. The syrup supply valve 35 is then manually or automatically activated. There will then be a measured amount of syrup and a measured number of containers to complete the run-out process.

It can be seen that this system 10 networks with the depalletizer, the bottling area of the plant, and the syrup supply room. The syrup recovery system is like the brain which connects all three areas together. Previous to this invention, plant personnel were often reduced to scurrying around the plant to keep track of information from all three areas.

Also included herein is a method for substantially eliminating waste of syrup and containers during beverage production, comprising the steps of:

(a) transferring remaining syrup in a syrup supply tank 13 into a syrup recovery tank 11 in a beverage production system through distribution lines 12;

(b) pushing the remaining syrup in the distribution lines 12 into the syrup recovery tank 11;

(c) automatically dropping the level in the syrup recovery tank 11 down to a pre-programmed level or set-point;

(d) automatically closing a gate 39 on a filler 38 in the beverage production system;

(e) measuring the number of containers 40 between the filler gate 39 and a depalletizer 41, which feeds containers to the filler on a conveyor belt;

(f) loading the conveyor belt with containers; and (g) opening the filler gate 39 and allowing the containers 40 to proceed into the filler 38. This method automatically gauges container and syrup inventories, when syrup inventory is limited and container inventory is not limited at the end of a production run. It preferably further comprising the steps of: (d2) lighting a depalletizer alarm to notify an operator, between steps (d) and (e); and (f2) pushing a depalletizer input button 42, between steps (f) and (g).

Also included herein is a method for substantially eliminating waste of syrup and containers during beverage production, comprising the steps of:

(a) automatically dropping the level in a syrup recovery tank 11 down to a preprogrammed level or set-point;

(b) automatically lighting a depalletizer alarm 42 to notify an operator;

(c) loading remaining containers 40 onto a conveyor belt, which leads to a filler 38;

(d) pushing a depalletizer input button 42 adapted to input to a microprocessor 22;

(e) closing a syrup supply valve 35 from a syrup supply tank 13; and (f) pushing remaining syrup in distribution lines 12, which lead from the syrup supply tank 13, into the syrup recovery tank 11. This method automatically gauges container and syrup inventories, when container inventory is limited and syrup inventory is not limited.

From the foregoing it can be realized that the described device of the present invention may be easily and conveniently utilized and achieves many advantages for the beverage company. With this syrup recovery system, a plant operator can monitor how much syrup has been used and how much remains at any point during the production process. This syrup recovery system can also automatically provide a precise number for how many bottles, cans, etc. will be needed for a particular production run. The operator can automatically monitor syrup and container inventories during a beverage production run, and end the production run with substantially no wasted syrup or containers. This reduces syrup loss, wasted containers, and precious downtime due to miscalculations in the number of containers needed.

This system also decreases syrup wasted during switch-overs between different types of soft drinks, e.g., cola to lemon-lime soda, which require different ratios of syrup-:water. It saves containers, product and man-hours at the end of production (during run-out). It addresses quality control problems and eliminates downtime due to tank changes. It decreases problems associated with air being mixed into the syrup during tank change-over. One of the quality control tests normally performed on sugared soft drinks during production is a Color test, which is also called a BRIX test, which is performed to assure that the color of the soft drink, e.g., cola, stays the same. The present system can minimize fluctuating BRIX results, or syrup pressure problems within production lines. The present system minimizes these problems by creating a void in the syrup line, allowing the air to purge from the syrup before it reaches the blender (proportioner). This means lower downtime due to BRIX problems, and less product placed on hold or discarded due to questionable quality.

The syrup recovery system of the present invention is also advantageous in that waste disposal problems are turned into profits by converting what was formerly waste syrup into production run material. Syrup loss and Biochemical Oxygen Demand (BOD) waste treatment surcharges are in this way decreased.

While preferred embodiments of the invention have been described using specific terms, this description is for illustrative purposes only. It will be apparent to those of ordinary skill in the art that various modifications may be made without departing from the spirit or scope of the invention, and that such modifications are intended to be within the scope of the present invention. It is intended that the doctrine of equivalents be relied upon to determine the fair scope of these claims in connection with any other person's product which fall outside the literal wording of these claims, but which in reality do not materially depart from this invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

BRIEF LIST OF REFERENCE NUMBERS USED IN THE DRAWINGS

For Information Only 10 syrup recovery system
11 syrup recovery tank
12 inlet distribution lines
13 syrup supply tank
14 level control valve
15 sightglass
16 divert valve
17 cleaning line
18 spray nozzle
19 inlet port
20 level indicator
21 control mechanism
22 microprocessor
23 electrical power source
24 level transmitter
25 transmitter probe
26 movable float
27 outlet distribution lines
28 outlet port
29 tank drain valve
30 conductivity sensor
31 centrifugal pump
32 pump drain valve
33 shut-off valve
34 carbon dioxide blow valve 35 syrup supply valve
36 syrup supply pump
37 blender
38 filler
39 filler stop gate
40 containers
41 depalletizer
42 depalletizer alarm and input button
43 syrup cut-off alarm

What is claimed is:

1. An apparatus for automatically gauging container and syrup requirements for beverage production, the apparatus comprising:

(a) an enclosed syrup recovery tank connected by at least one inlet distribution line to at least one syrup supply tank, and connected to at least one outlet distribution line leading out of the syrup recovery tank;

(b) an inlet port leading into the syrup recovery tank, the inlet port being located on a lower portion of the syrup recovery tank and being connected to the syrup supply tank by the inlet distribution line, syrup being transportable through the inlet distribution line into the syrup recovery tank from at least one syrup supply tank;

(c) an outlet port on a lower portion of the syrup recovery tank, the syrup being transportable from the syrup recovery tank through the outlet port and through the outlet distribution line;

(d) a centrifugal pump connected to the outlet distribution line adjacent to the syrup recovery tank, the pump being adapted for pumping syrup from the syrup recovery tank through the outlet distribution line;

(e) a microprocessor in communication with the syrup recovery tank;

(f) a level transmitter within the syrup recovery tank adapted for measuring syrup levels within the syrup recovery tank and transmitting information concerning syrup levels to the microprocessor;

(g) a level control valve on the inlet distribution line for controlling the flow of syrup to the syrup recovery tank, the level control valve being adapted to receive input from the microprocessor;

(h) a control mechanism connected to the microprocessor adapted to enable a user to input to the microprocessor, and to receive information from the microprocessor, and (i) a source of electrical power, the electrical power source being within, on, or connected to the control mechanism;

wherein the apparatus allows conservation of syrup and containers.

2. An apparatus according to claim 1, wherein the control mechanism comprises an input/output screen for inputting information to the microprocessor and visually displaying information received from the microprocessor.

3. An apparatus according to claim 2, wherein an operator can automatically monitor syrup and container inventories during a beverage production run, and end the production run with substantially no wasted syrup or containers.

4. An apparatus for automatically gauging container and syrup requirements for beverage production, the apparatus comprising:

(a) an enclosed syrup recovery tank connected by at least one inlet distribution line to at least one syrup supply tank, and connected to at least one outlet distribution line leading out of the syrup recovery tank;

(b) an inlet port leading into the syrup recovery tank, the inlet port being located on a lower portion of the syrup recovery tank and being connected to the syrup supply tank by the inlet distribution line, syrup being transportable through the inlet distribution line into the syrup recovery tank from at least one syrup supply tank;

(c) an outlet port on a lower portion of the syrup recovery tank, the syrup being transportable from the syrup recovery tank through the outlet port and through the outlet distribution line;

(d) a pump connected to the outlet distribution line adjacent to the syrup recovery tank, the pump being adapted for pumping syrup from the syrup recovery tank through the outlet distribution line;

(e) a microprocessor in communication with the syrup recovery tank;

(f) a level transmitter within the syrup recovery tank adapted for measuring syrup levels within the syrup recovery tank and transmitting information concerning syrup levels to the microprocessor;

(g) a level control valve on the inlet distribution line for controlling the flow of syrup to the syrup recovery tank, the level control valve being adapted to receive input from the microprocessor;

(h) a control mechanism connected to the microprocessor adapted to enable a user to input to the microprocessor, and to receive information from the microprocessor, the control mechanism comprising a screen for visually displaying information received from the microprocessor; and (i) a source of electrical power in communication with the control mechanism;

wherein an inlet distribution line includes a divert valve adapted for diverting syrup to a line for cleaning the syrup recovery tank; and wherein the apparatus allows conservation of syrup and beverage containers.

5. An apparatus according to claim 4, wherein the microprocessor is connected to: the level control valve, the divert valve, the level transmitter, and a drain valve for draining the syrup recovery tank.

6. An apparatus according to claim 5, wherein the level transmitter comprises a probe, which extends down into the syrup recovery tank, and a movable float on the probe adapted to float on top of the syrup in the syrup recovery tank.

7. An apparatus according to claim 6, the level control valve being automatically openable and closable by the microprocessor.

8. An apparatus according to claim 7, the microprocessor automatically controlling opening or closing a stop gate on a filler in a beverage production system comprising the syrup recovery apparatus.

9. An apparatus according to claim 7, the microprocessor automatically controlling opening or closing of a syrup supply valve on a distribution line from a syrup supply tank.

10. An apparatus according to claim 4, wherein the pump is a centrifugal pump.

11. An apparatus according to claim 10, wherein the microprocessor also inputs to a depalletizer alarm and input button, and a syrup cut-off alarm.

12. An apparatus according to claim 11, further comprising a conductivity sensor on the outlet distribution line, the conductivity sensor being adapted for inputting to the microprocessor when the syrup recovery tank has emptied.

* * * * *